United States Patent [19]

Kawasaki et al.

[11] 4,395,106
[45] Jul. 26, 1983

[54] COMPENSATION FOR DIAPHRAGM CONTROL IN SLR CAMERA

[75] Inventors: Masahiro Kawasaki, Tokyo; Zenichi Okura, Ichikawa; Fumio Urano, Omiya, all of Japan

[73] Assignee: Asahi Kogaku Kogyo Kabushiki Kaisha, Tokyo, Japan

[21] Appl. No.: 300,683

[22] Filed: Sep. 9, 1981

[30] Foreign Application Priority Data

Sep. 11, 1980 [JP] Japan ................................ 55-126782

[51] Int. Cl.³ .............................................. G03B 7/20
[52] U.S. Cl. ........................................ 354/271; 354/46
[58] Field of Search ................ 354/43, 46, 271, 286

[56] References Cited

U.S. PATENT DOCUMENTS 4,168,892  9/1979  Ueda et al. ...................... 354/46 X
4,245,901  1/1981  Karikawa et al. ............... 354/46 X Primary Examiner—Michael L. Gellner
Attorney, Agent, or Firm—Christie, Parker & Hale

[57] ABSTRACT

A camera has first and second displaceable actuators and a diaphragm adjustable between a maximum aperture value and a minimum aperture value responsive to displacement of the second actuator. A first signal is generated that is representative of the displacement of the first actuator. A second signal is generated that is representative of a desired aperture value of the diaphragm for correct exposure. A first and second signal are compared. The first actuator is displaced upon shutter release, but the second actuator remains stationary during an initial portion of the displacement of the first actuator and is displaced as a unit with the first actuator during the remainder of the displacement of the first actuator. When the first and second signals assume a predetermined relationship as indicated by the comparison, displacement of the actuators is arrested and the proper aperture value is provided. In a camera having interchangeable lenses, the first actuator is disposed in the camera body so that none of the parts of the first signal generator need to be placed in the lens.

4 Claims, 6 Drawing Figures

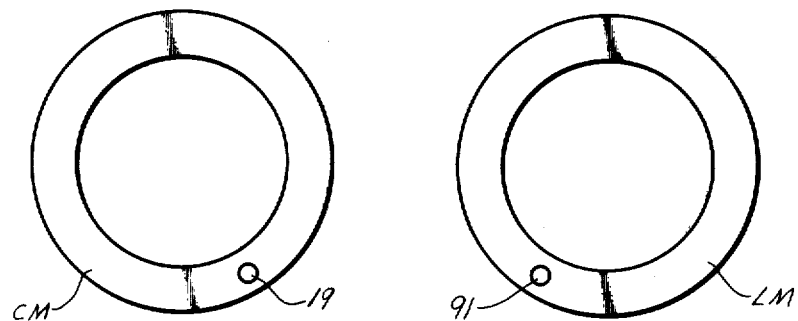
fig 5
fig 6
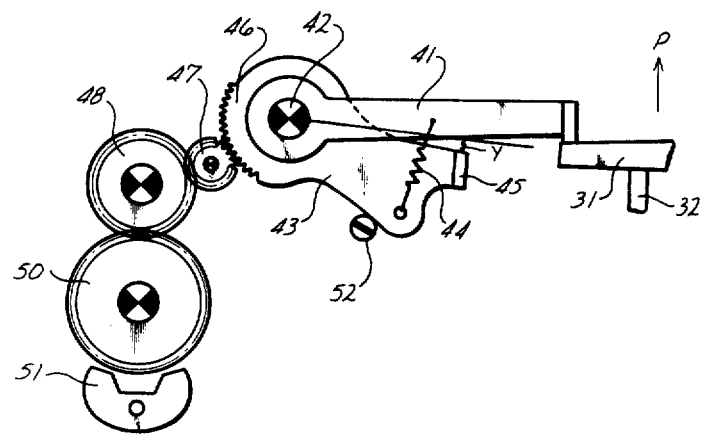

COMPENSATION FOR DIAPHRAGM CONTROL IN SLR CAMERA

CROSS-REFERENCE TO RELATED APPLICATIONS

This application is related to the following applications, the disclosures of which are incorporated herein fully by reference: Ser. No. 229,879, filed Jan. 30, 1981; Ser. No. 235,839, filed Feb. 19, 1981; and Ser. No. 235,840, filed Feb. 19, 1981.

BACKGROUND OF THE INVENTION

This invention relates to compensation in a single-lens reflex (SLR) camera and is particularly applicable to such a camera having automatic exposure capability and interchangeable lenses.

It is well known for the single-lens reflex camera using interchangeable lens that, when photometric operation is done within the camera through an interchangeably mounted lens with the diaphragm of said lens being fully opened (so-called TTL photometry with fully opened diaphragm), using a resultant value by directly coupling it with an exposure meter or subjecting said value to an automatic exposure control operation would lead to a great error between an exposure value to be set and said photometric value so that photographing with a proper exposure would not be obtained.

Such deviation or error is largely classified into the one due to optical characteristics of individual lenses interchangeably mounted on camera and the one due to specific position at which a light receiving element is located within camera. The former is caused by a fact that the lens aperture stopped down by a diaphragm adapted to be preset by a diaphragm preset ring at a moment of photographing cannot produce an accurate multiple proportional variation of actual illumination intensity in the film plane corresponding to a multiple proportional variation of preset diaphragm value marked around the diaphragm preset ring. More specifically, individual interchangeable lenses are different in their lens materials, lens arrangements, and assembling modes, so that the illumination intensity in the film plane depends upon a light transmissivity characteristics, a vignetting effect peculiar to each lens, and particularly so-called aperture eclipse occurring with the fully opened diaphragm which substantially reduces the effective illumination intensity in the film plane when the lens aperture is held close to its fully opened diaphragm value. In consequence, the illumination intensity in the film plane is reduced in its effective value and varies in a mode far from said multiple proportional variation as the lens aperture approaches to the fully opened diaphragm value while the illumination intensity which is practically uniform and multiple proportionally varies substantially corresponding to the successive steps of preset values marked around the periphery of the diaphragm preset ring, can be obtained within a range of relatively small lens aperture values, for example, less than a F-value of 5.6. Effective value of the illumination intensity in the film plane is substantially reduced at the fully opened diaphragm (the maximum lens aperture) and a resultant value of photometric operation carried out at this fully opened diaphragm cannot be utilized to obtain a proper exposure, since it would be impossible, from this resultant value, to produce a multiple proportional variation of exposure exactly or acceptably corresponding to the multiple proportional variation of successive preset values within the range of relatively small lens apertures and thereby to obtain an exposure time corresponding to a preset diaphragm value. Such error appearing in the film plane due to variation of illumination intensity depending upon individual interchangeable objectives is referred to herein as the illumination intensity error in the film plane.

The photometric element exposed to the light coming through the lens with fully opened diaphragm is preferably located just in the film plane so that said photometric element may be operatively coupled to an exposure meter or utilized for automatic exposure control to obtain a proper exposure. However, if photometric operation is actually performed just in the film plane, the photometric element would be a critical obstacle for film exposure in photographing and it would possibly lead to a solution that the photometric element is located not in the film plane itself, but at a position which is equivalent to said film plane or causes little photometric deviation from the value which would be obtained from the photometric operation performed just in the film plane. Such photometric position equivalent to the film plane may be, for example, a position of a focussing plate on which the light reflected by a mirror is focussed and this position is, in fact, preferred in that this position is in a conjugate relationship with the film plane. However, this position would be an obstacle not only for the user's view through a viewfinder, but also for the user's focus adjusting operation. Accordingly, the photometric element has usually been located, in most cases, on the light exit end surface of a pentagonal-dachkant-prism or similar optical system for reflection and inversion of light which is mounted on the focussing plate, particularly along the periphery of a viewfinder eyepiece so that a viewing therethrough should not be prevented. Even such position of the photometric element has been encountered by a problem that a photometric result is obtained as a value slightly lower or darker than the illumination intensity actually given in the film plane, since the position of the photometric element is deeper than the position of the focussing plate which is practically equivalent and conjugate to the film plane by a length of the optical reflection and inversion path defined by said prism and there occurs much or less light absorption by said prism. It will be obvious that such location of the photometric element has never achieved the intended photometric effect exactly equivalent to that obtained from the photometric operation performed just in the film plane and necessarily subjected to an error depending upon a focal distance of each interchangeably mounted lens. The error of this type is referred to herein as the illumination intensity error due to the position of the photometric element.

Thus, the respective errors as above mentioned inevitably appear as various quantities of deviation from the actual photometric values which should be obtained through the fully opened diaphragms no matter whether the objectives have the same value of their fully opened diaphragm or the same focal distance. (Detail of these errors is illustrated and described in the specification of Japanese Patent Application No. 41(1966)-49771.)

With the photographic camera of so-called diaphragm regulation priority type, it is usual to transmit an information signal corresponding to a preset diaphragm value from the lens to a photometric instrument or its associated circuit or an exposure control circuit in the camera body by suitable mechanical means such as a cam (an example of such means is disclosed in Japanese Patent Publication No. 53(1978)-33064) or by suitable electrical compensator means such as a variable resistor control of special arrangement depending upon a diaphragm value actually preset so that the exposure control of high precision can be achieved with an effective compensation of the errors as mentioned above and thereby a proper exposure is given.

SUMMARY OF THE INVENTION

According to the present invention, various error quantities of the previously mentioned two categories depending upond different objectives interchangeably mounted on camera body are compensated by the displacement quantity occurring in the mechanically operative system when the operation of stopping down is mechanically transmitted from the camera body to the lens so that a precision is effectively improved for the automatic exposure control in which the operation of stopping down is performed on the basis of an exposure time preset with priority.

Specifically, the camera has first and second displaceable actuators and a diaphragm adjustable between a maximum aperture value and a minimum aperture value responsive to displacement of the second actuator. A first signal is generated that is representative of the displacement of the first actuator. A second signal is generated that is representative of a desired aperture value of the diaphragm for correct exposure. A first and second signal are compared. The first actuator is displaced upon shutter release, but the second actuator remains stationary during an initial portion of the displacement of the first actuator and is displaced as a unit with the first actuator during the remainder of the displacement of the first actuator. When the first and second signals assume a predetermined relationship as indicated by the comparison, displacement of the actuators is arrested and the proper aperture value is provided. In a camera having interchangeable lenses, the first actuator is disposed in the camera body so that none of the parts of the first signal generator need to be placed in the lens.

BRIEF DESCRIPTION OF THE DRAWINGS

The features of a specific embodiment of the best mode contemplated of carrying out the invention are illustrated in the drawings, in which:

FIG. 5 is a front view of a camera body and a rear view of an interchangeable lens illustrating the mounts on such camera body and lens with electrical contacts; and FIG. 6 is a schematic diagram of a mechanism for introducing compensation into the system of FIG. 2 in accordance with principles of the invention.

DETAILED DESCRIPTION OF THE SPECIFIC EMBODIMENT

Figure 1:
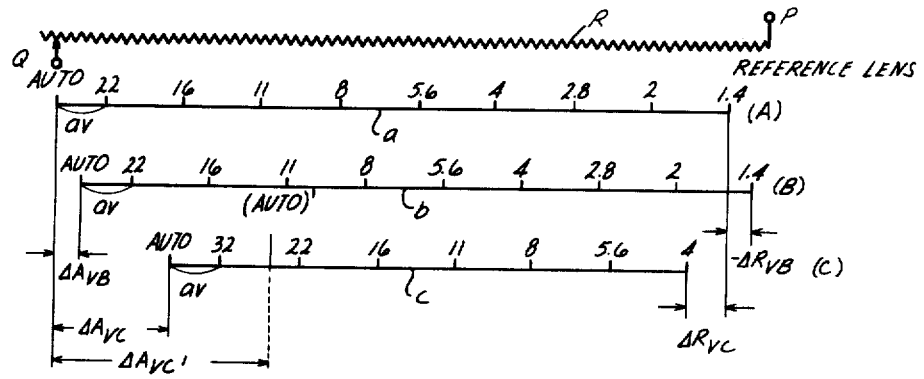
FIG. 1 is a schematic diagram illustrating the relationship between different parameters of a plurality of interchangeable lenses as represented by resistance values selected by a lever operatively associated with a diaphragm preset ring.

The conception of the invention to achieve such object will be now considered by way of a simplified example. Assume that, with respect to a lens A having a fully opened diaphragm value of F 1.4 as the reference lens, a light quantity coming through another lens X having a fully opened diaphragm value of F 1.4 and being incident upon the light receiving element corresponds only to the light quantity which will come through said lens A when the latter is stopped down to a value of F 1.7, the light quantity obtained through the lens X is considered to be lower by 0.5 EV than through the reference lens A. If a relationship of $Av' = Bv' + Sv - Tv$ is established with respect to the reference lens A, application of Apex operation $Av = Bv + Sv - Tv$ will give a relationship $Av'' = (Bv' - 0.5) + Sv - Tv$ with respect to the lens X.

For example, conditions are assumed as following:

Brightness of an object to be photographed: $Bv = 8(EV)$,
Film sensitivity: $Sv = 5(EV)$,
Exposure time: $Tv = 8(EV)$, and $Bv' = 7$.

(It is assumed here that, also concerning the reference lens A, the effective illumination intensity incident on the light receiving element takes a value lower by approximately 1 EV and, even with the fully opened diaphragm value of F 1.4, not $Bv' = 8$, but $Bv' = 7$.)

Calculation according to the above mentioned formula based on these values given by way of examples gives respective values of Av, Av′, and Av″ as following:

$Av = 5$, $Av' = 4$ (EV), $AV'' = 3.5$ (EV), wherein $Av = 5$ indicates that the diaphragm value after the operation of stopping down corresponds to F 5.6.

With respect to the reference lens A, if the displacement quantity of the mechanically operative system during the operation of stopping down is provided with a portion for error compensation corresponding to 1 EV as a preliminary displacement quantity of the diaphragm driving member or the transmission member associated therewith that takes no part in the light intensity quantity control effect, the displacement quantity of said diaphragm driving member that actually takes part in the operation of stopping down will substantially correspond to $Av' + 1 = 5$ (EV) and thereby a diaphragm value $Av = 5$ (corresponding to a diaphragm value of F 5.6) will be obtained. The lens X similarly provided with a preliminary displacement corresponding to 1 EV will be stopped down by $Av'' + 1 = 4.5$ (EV) to $Av = 4.5$ (corresponding to a diaphragm value of 4.5 after stopped down) with a deviation of 0.5 EV from the reference lens A with respect to the same object to be photographed. To overcome such deviation, the preliminary displacement quantity of the lens X is set 0.5 EV smaller than that of the lens A (set to a quantity corresponding to 0.5 EV) so that the lens X is stopped down by a quantity of $Av'' + 1 = 4.5$ EV to the position $Av = 5$ (corresponding to the diaphragm value of F 5.6) in coincidence with the case of the reference lens A.

The basic conception of the present invention thus lies in achieving the desired error compensation by providing a part of the mechanically operative system adapted to transmit movement of the diaphragm driving member operating in the camera body to diaphragm blades in the lens with the displacement quantity that takes no part in the light quantity control through the operation of stopping down in operative association with said transmission so that various errors such as the difference of the fully opened diaphragm values (maximum lens apertures), the illumination intensity errors in the film plane depending upon individual objectives and the illumination intensity errors due to the positions of the respective light receiving elements are properly and reliably compensated with a highly precise diaphragm value as a result of stopping down.

Before describing the construction of the present invention in detail, procedures for compensation of said errors will be considered with respect to the photographic camera of diaphragm adjustment priority type and the compensator means according to the present invention will be described along these procedures for better comprehension. Referring to FIG. 1, R designates a variable resistor provided in the camera body, of which a resistance value is selectively set by a lever operatively associated with a diaphragm preset ring of respective objective interchangeably mounted on the camera. Specifically, a resistance value of said variable resistor R peculiar to a given preset diaphragm value is set as said diaphragm preset ring is rotated to said given preset diaphragm value. Even when one objective has the same fully opened diaphragm value as another objective, the respective effective values of illumination intensity in the film plane are different from each other at their fully opened diaphragm values so far as they are different in their lens designs or other aspect. When they are the same in their fully opened diaphragm values, but different in their focal distances, there occurs, in addition to a variation of the illumination intensity error in the film plane, a variation of the illumination intensity error due to the position of the photometric element. As a result, the resistance value of the variable resistor R selected by the lever of each objective at the fully opened diaphragm value should be peculiar to this objective.

In view of a fact that the objective interchangeably mounted on the camera may be the same, both in their fully opened diaphragm values and in their focal distances, but different in their lens designs, or the same in their focal distances, but different in their fully opened diaphragm values, or the same in their fully opened diaphragm values, but different in their focal distances, and so on, one objective which is considered most standard is chosen as the reference lens on the basis of which all the other different objectives are subjected to desired compensation so that the levers operatively associated with the diaphragm preset rings of the respective interchangeable objectives may select proper resistance values at their fully opened diaphragm values. It is obvious that, also with such reference lens (hereinafter referred to as the reference lens A and illustrated by FIG. 1), the effective illumination intensity in the film plane is lower than the level according to the associated nominal diaphragm value so far as the fully opened diaphragm value or a range of values adjacent thereto is concerned while a series of multiple proportional diaphragm values within a range of relatively small diaphragm values bring about substantially multiple proportional variation of illumination intensity in the film plane. Obviously, a photometric result is influenced not only by such general characteristics, but also by the illumination intensity error due to the position of the photometric element.

Based on the illumination intensity error in the film plane and the illumination intensity error due to the position of the photometric element determined with respect to the reference lens A (for example, having a fully opened diaphragm value of F 1.4), the lever operatively associated with the diaphragm of this reference lens A is adapted to be driven and positioned so that respective preset diaphragm values corresponding to regular interval graduations on the diaphragm preset ring which are representative of multiple proportional diaphragm values may result in proper selection of respective resistance values utilized for arithmetic operation of the photometric circuit of the automatic exposure control circuit, then a relative position relationship between the variable resistor R in the camera body of which the resistance value is selected by the lever operatively associated with the diaphragm value preset ring of the reference lens A as a given diaphragm value is preset on one hand, and the diaphragm preset ring a adapted to drive said lever operatively associated with the diaphragm preset ring on the other hand would be as illustrated by (A) of FIG. 1. Under this position relationship, a lens B being the same in its fully opened diaphragm value F 1.4, but different in the other aspects, has its diaphragm preset ring b positioned as illustrated by (B) of FIG. 1 and, further, another lens C having a smaller lens opening with its diaphragm preset ring c positioned as illustrated by (C) of FIG. 1. It should be noted here that the position relationship has been illustrated in FIG. 1 as the relative positions of the respective diaphragm values of preset ring when the diaphragm values of the respective lenses are preset to their fully opened diaphragm values to facilitate understanding of various features of the present invention which will be described later.

By adjustably rotating the diaphragm preset ring of the respective lenses A, B, and C from such relative position relationship, both the illumination intensity error in the film plane and the illumination intensity error due to the position of the photometric element are so effectively compensated that not only a photometric signal corresponding to the actual illumination intensity in the film plane produced through the fully opened diaphragm is transmitted to an arithmetic section of the photometric circuit or the exposure control circuit, but also a given diaphragm value preset by rotating the diaphragm preset ring from the respective original positions properly brings about a correspondingly multiple-proportional value of exposure.

Such method of error compensation falls under a classification in which the information on diaphragm value applied to the arithmetic section of the exposure control circuit according to the diaphragm value priority mode is replaced by a resistance value selected by a given preset diaphragm value. When this method of error compensation is applied to the shutter speed priority mode in which an exposure time is set with priority and then the objective is stopped down to a diaphragm value corresponding to a resistance value which will give a proper exposure, a result will be as follows. The resistance value given as a result of such stopping down already includes an effective compensation of both the illumination intensity error in the film plane and the illumination intensity error due to the position of the photometric element and, accordingly, this resistance value may be utilized as an arithmetic factor for automatic exposure regulation to regulate a quantity of actuation for automatic diaphragm control. On the assumption that the same diaphragm preset ring as used for the diaphragm priority mode is utilized, a preset position for automatic diaphragm control is selected on said diaphragm preset ring at a predetermined angular or rotational distance (corresponding to $a_v$ as illustrated and, in this case, $a_v \geq 0$) from the rotational position for the fully closed diaphragm value so that both the illumination intensity error in the film plane and the illumination intensity error due to the position of the photometric element may be effectively incorporated in operation of stopping down. Such preset position for automatic diaphragm control depends upon individual interchangeable objective as illustrated by FIG. 1, in which the diaphragm preset ring a of the reference lens A has its automatic diaphragm control marking (Auto) at an angular distance $a_v$ from the marking of the fully closed diaphragm value F 22 while the diaphragm preset ring b of the lens B which has the same fully opened diaphragm value and fully closed diaphragm value as the reference lens A and having the lever operatively associated with diaphragm of lens B which is compensated for the illumination intensity error in the film plane and the illumination intensity error due to the position of the photometric element bears thereon its peculiar preset position for automatic diaphragm control (Auto) at an angular distance $\Delta AvB$ from the corresponding position for the reference lens A. Similarly, the diaphragm preset ring c of the lens C has its peculiar preset position (Auto) for automatic diaphragm control at an angular distance $\Delta AvC$ from the corresponding preset position for the reference lens A when the fully closed diaphragm value is at F 32 and at an angular distance $Av'C$ when the fully closed diaphragm value is at F 22. As will be readily understood, these angular distances or deviations or $\Delta Av$ in general are determined depending not only upon the deviations ($-\Delta RvB$ for the lens B and $\Delta RvC$ for the lens C) due to different points of starting the operation which are, in turn, determined by different fully opened diaphragms and other characteristics peculiar to the respective objectives interchangeably mounted on the camera, but also upon the different fully closed diaphragm values marked on the respective diaphragm preset rings.

According to the present invention, therefore, the deviation due to different fully closed diaphragm values depending upon the respective interchangeable lenses is transmitted from the lens interchangeably mounted on the camera to the camera body as an information signal for the automatic exposure control in the exposure time priority mode (so-called shutter priority mode) on one hand, and the deviations such as said $\Delta RvB$ and $\Delta RvC$ ($\Delta Rv$ in general) which can be known in advance, inclusive of the different fully opened diaphragm values depending upon the respective lenses interchangeably mounted on the camera, the illumination intensity errors in the film plane and the illumination intensity errors due to the position of the light receiving element, are replaced by a compensation value as a portion of the displacement quantity occurring in the mechanically operative system of the respective interchangeable lens functioning from the camera body towards the diaphragm blades on the other hand so that the automatic exposure control can be realized at a high precision.

From the basic conception as mentioned above, an arithmetic expression established when the diaphragm preset ring has been set to the automatic diaphragm control position (Auto) will be considered. This expression is given in the following form according to the exposure time regulation priority mode (or the shutter priority mode), assumed that all the units are represented by EV values.

$$Av = Bv' + Sv - Tv + \Delta Av - \Delta Amin + 1 \ldots (1)$$

wherein:
Av: diaphragm value;
Bv': brightness value of object to be photographed after transmission through the objective;
Sv: sensitivity value of film used for photographing;
Tv: shutter speed value set with priority;
$\Delta Av$: deviation from reference lens A;
$\Delta Amin$: a difference between the fully closed diaphragm value of the reference lens A and the fully closed diaphragm value of each lens interchangeably mounted on the camera; with respect to the fully closed diaphragm value F 22 of the reference lens A, as illustrated by FIG. 1, $\Delta Amin = 0$ when the lens to be mounted on the camera has a fully closed diaphragm value of F 22, while $\Delta Amin = -1$ when the lens to be mounted on the camera has a fully closed diaphragm value of F 32, and such information is transmitted from the lens to the arithmetic circuit in the camera body as the deviation or difference signal simultaneously when the lens is interchanged. (1 is the EV value given relative to the fully opened diaphragm value F 1.4 of the reference lens A.) The diaphragm value Av obtained by the previously mentioned expression (1) has already been incorporated with compensation of the illumination intensity error in the film plane and the illumination intensity error due to the position of the photometric or light receiving element. In the case in which the diaphragm value is preset by rotation of the diaphragm preset ring in the diaphragm value priority mode, instead of relying upon the automatic diaphragm control (Auto), the shutter speed can be obtained by mutually transferring the terms Av and Tv in said expression (1), namely, $$Tv = Bv' + Sv - Av + \Delta Av - \Delta Amin + 1 \ldots (2)$$

The exposure control and its value may be used for display within the viewfinder.

Operation of the automatic diaphragm control is accomplished when a member provided in the camera body operatively associated with the shutter release drives a release plate in the lens and thereupon the release plate is displaced from a position at which the diaphragm mechanism is held fully opened to a position at which said diaphragm mechanism reaches a given EV value. A displacement quantity of said release plate is in a linear proportion to a quantity of stopping down and, therefore, the Av value obtained from said expression (1) cannot be directly utilized as a control value for the diaphragm. When a value, for example, $Av = 5$ (F 5.6) is used as the arithmetic operation value for the diaphragm control, stopping down by a quantity of 4 EV results in stopping down to F 5.6 so far as an objective having its fully opened diaphragm value of F 1.4 ($Av = 1$), in this case, when the fully opened diaphragm value of the lens is F 4 ($Av = 4$), F 5.6 ($Av = 5$) can be obtained by stopping down of the lens to an amount corresponding to 1 EV. Thus, the EV quantity necessary for a desired quantity of stopping down is obtained in the form of a difference or deviation between the EV value as a result of arithmetic operation and the fully opened diaphragm expressed in EV value and the Pv expressed in EV value as the control quantity is given by the following formula:

$$Pv = Bv' + Sv - Tv + \Delta Av - \Delta A\min + 1 - A\max = Av - A\max \quad \ldots (3)$$

wherein Amax represents the EV value at the fully opened diaphragm depending upon individual lenses interchanged.

It will be obvious from the above formula that the Pv expressed in Ev value as the control quantity depends upon the fully opened diaphragm values of the respective lenses which determine a precision of said control quantity Pv. Accordingly, when a particular lens is mounted on the camera, it is required to transmit the fully opened diaphragm value peculiar to the lens from the lens to the camera body as a signal which identifies this lens.

Generally, the objective preferably has a large value of its fully opened diaphragm to be used for photographing, since it provides a viewfinder image sufficiently bright to detect an exact focussed point during focus adjustment as well as for viewing the composition of a scene and enlarges a range of stopping down and thereby enlarges the exposure range that can be photographed. However, this preferable condition is adversely limited by the requirement for various aspects such as optical characteristics and lens size. Thus, it will be practically difficult and even disadvantageous to extract Amax signals in said formula (3) with respect to all the interchangeable lenses over a wide variety and then to transmit them to the camera body in view of factors such as a space for incorporation, a cost therefor, and a reliability in operation.

To overcome such problem, the present invention proposes that an error in the automatic diaphragm control due to the differences of the fully opened diaphragm values, the illumination intensity error in the film plane which is characteristic of each lens, and the illumination intensity error due to the position of photometric element, is compensated by a special operation of the member taking part in the diaphragm control, namely, the diaphragm driving member in the camera body or a member operatively associated therewith to bring the diaphragm mechanism to a position corresponding to the desired diaphragm value.

The term "a special operation" used herein means the part in the course of operation of an operative system starting from said diaphragm driving member in the camera body and terminating in the diaphragm blades that directly takes no part in stopping said diaphragm blades down to the desired diaphragm value. This operation taking no part directly in stopping down will be referred to herein as a preliminary displacement and a quantity of displacement of the members constituting said operative system during said operation taking no part in stopping down, namely, before the operation for stopping down the diaphragm blades actually starts to stop the lens aperture down beyond the fully opened diaphragm to the desired value for control of the light quantity will be referred to herein as a quantity of preliminary displacement.

Substitution of:

$$\Delta Av - \Delta A\min + 1 - A\max = \Delta Rv \quad (4)$$

into said formula 3 and replacement of a value corresponding to $\Delta Rv$ depending upon the individual lenses by said quantity of preliminary displacement make disappear the Amax signal corresponding to the EV value depending upon the fully opened diaphragm value from said formula 3 and the EV value of Pv as a control quantity is given by $$Pv = Bv' + Sv - Tv \quad (5)$$

Such aspect will be considered with respect to the lenses C and B of FIG. 1. The preliminary displacement quantity of the lens C may be set larger by $\Delta RvC$ with respect to the lens A and the preliminary displacement quantity of the lens B may be set smaller by $\Delta RvB$ with respect also to the lens A to eliminate the deviation due to different values of the respective fully opened diaphragms, the light intensity error in the film plane depending upon the individual objectives and the light intensity due to the position of the light receiving element.

Figure 2:
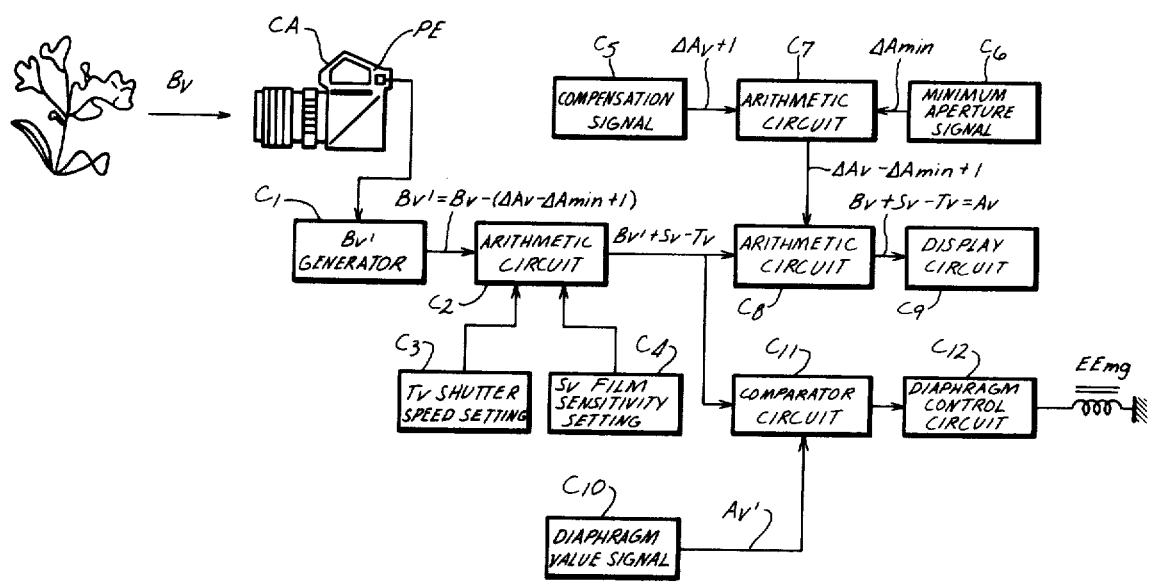
FIG. 2 is a block schematic diagram of an automatic diaphragm control system incorporating the principles of the invention.

An example of the single-lens reflex camera in which the automatic diaphragm control is effected according to such arithmetic formula is illustrated by FIG. 2, wherein CA designates a camera and Bv designates a brightness of an object to be photographed. It has previously been mentioned that a light quantity coming from the object having its brightness Bv through the objective and to which a photometric element PE is exposed takes an inherent value depending upon a fully opened aperture of this lens, a light absorption coefficient, an internal reflection and vignetting effect of this lens, and the other factors. An output provided from the photometric element PE is log-compressed by a Bv' generator $C_1$ in the form of $$Bv' = Bv - (\Delta Av - \Delta A\min + 1) \quad (1)$$

and then applied to an arithmetic circuit $C_2$ which is also applied with an information signal Tv based on the exposure time (shutter speed) set with priority and another information signal Sv based on the sensitivity of the film in use from a shutter speed regulating member $C_3$ and a film sensitivity regulating member $C_4$, respectively. Thus, the arithmetic circuit $C_2$ provides a resultant information signal as follows:

$$Bv' + Sv - Tv \quad (2)$$

When an interchangeable lens is mounted on the camera CA and its diaphragm preset ring is rotated to the automatic diaphragm control position (Auto), a value $\Delta Av$ peculiar to this lens and a constant value 1 added thereto through a circuit processing is:

$$\Delta Av + 1 \quad (3)$$

which is output from a compensation signal member $C_5$ and input to an arithmetic circuit $C_7$. On the other hand, the arithmetic circuit $C_7$ is applied with an information signal $$\Delta A\min \quad (4)$$

which corresponds to a deviation of a fully closed diaphragm value peculiar to this lens from the fully closed diaphragm value of the reference lens A from a minimum aperture signal member $C_6$. As a result, the arithmetic circuit $C_7$ provides a resultant output $$\Delta Av - \Delta Amin + 1 \quad (5)$$

This output is applied together with the output expressed by the formula (2) coming from said arithmetic circuit $C_2$ to an arithmetic circuit $C_8$ in which an arithmetic operation (2)+(5) is performed.

$$Bv' + Sv - Tv + \Delta Av - \Delta Amin + 1 = Av$$

Substitution of Bv' from the formula (1) gives $$Bv + Sv - Tv = Av \quad (6)$$

and thus it is possible to obtain an Apex quantity Av of the diaphragm value.

Such Av value can be displayed within a viewfinder by a display circuit $C_9$ consisting, for example, of a meter. The information signal Av subjected to this display merely indicates a diaphragm value providing a proper exposure with respect to the exposure time (shutter speed) set with priority, but not the automatic control quantity as it has previously been mentioned. To effect stopping down with the automatic diaphragm control quantity Pv in operative association with the operation of shutter release, said output (2) provided from the arithmetic circuit $C_2$ and the diaphragm value signal Av' formed by a diaphragm value signal generator member $C_{10}$ according to the diaphragm value of the lens are applied into a comparator circuit $C_{11}$ so that both these signals are compared to each other in said comparator circuit and, when the output Av' reaches said output Av, the coincidence signal output is applied to a diaphragm control circuit $C_{12}$ and thereby a diaphragm control magnet E Emg is released, with an effective result that the diaphragm value is adjusted to said Av corresponding to the arithmetic result.

Figure 3:
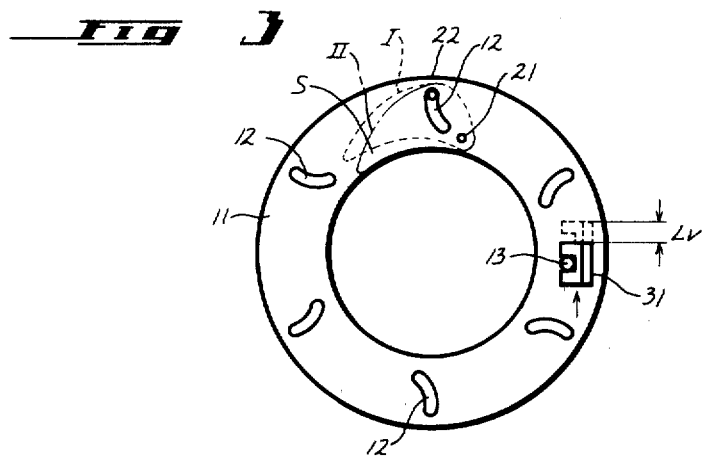
FIG. 3 is a rear view of a mechanism for adjusting the aperture value of the diaphragm.

FIG. 3 illustrates, by way of example, an arrangement in which said preliminary displacement occurs in a part of the members constituting the operative system interposed between the diaphragm driving member in the camera body and the diaphragm blades in the lens before said diaphragm blades begin to be moved from the fully opened position to the desired stopped down position for control of light quantity.

Referring to FIG. 3, S designates one of diaphragm blades forming together an iris diaphragm and 11 designates a diaphragm blade actuating ring which rotates the diaphragm blades S around associated pivot pin 21. Said diaphragm blade actuating ring 11 itself is adapted to be rotated around the optical axis with respect to a stationary part of the lens barrel. 12 designates a plurality of cam grooves formed in said diaphragm blade actuating ring 11 and a driven pin 22 on each blade S is adapted to be engaged with each groove. On the side of said diaphragm blade actuating ring 11, there is provided a fixed pin 13 adapted to be engaged with a release plate 31 which is, in turn, driven by the diaphragm driving member actuated in the camera body in operative association with the operation of shutter release. The diaphragm blade actuating ring 11 is potentially biased by a spring in the direction opposed to the direction indicated by an arrow in FIG. 3 so that said diaphragm blade actuating ring 11 normally tends to open the iris diaphragm towards its fully opened position. The position of the release plate 31, as illustrated, corresponds to the starting position of this release plate 31, at which the respective diaphragm blades S take their positions I indicated by broken lines. Inner edge of each diaphragm blade S is situated inwardly of a circumferential opening which defines the maximum aperture of this lens. From these positions, the respective diaphragm blades S are rotated around the respective pivot pin 21 with its associated driven pin 22 being guided along the associated cam groove 12 as the release plate 31 is urged upward by the diaphragm driving member or a transmission member thereof in the direction indicated by the arrow and thereby the diaphragm blade actuating ring 11 is rotated via the pin 13, until the respective diaphragm blades S reach their positions II indicated by chain lines, at which their inner edges are brought into coincidence with said circumferential opening defining the maximum aperture of the lens. The positions II of respective blades S correspond to the positions of blades in the fully opened diaphragm. Further rotation of the diaphragm blade actuating ring 11 actually begin to stop the lens down beyond the positions II of the respective diaphragm blades S. Thus, during movement from the positions I to the positions II, the respective diaphragm blades S have no function of incident light quantity control and operation of the release plate 31 takes no part in actual operation for stopping down. The operation of said release plate 31 from the starting position to the position illustrated by broken lines corresponds to the preliminary displacement which is an important feature of the present invention and a quantity of such displacement Lv is given as the quantity of preliminary displacement. Although this quantity of preliminary displacement occurs as a relative movement of the release plate 31 and the diaphragm blades S in the embodiment, as illustrated in FIG. 3, this may be set as a relative movement between the diaphragm driving member in the camera body and said release plate 31, as shown in FIG. 6.

To provide the individual lenses, for example, the lenses B and C with respective preliminary displacement quantities Lv, these quantities may be selected so that $Lv = \alpha - \Delta RvB$ for the lens B while $Lv = \alpha + \Delta RvC$ for the lens C, as it has previously been mentioned, when the reference lens A has its quantity of preliminary displacement expressed by $$Lv = \alpha.$$

However, these quantities of preliminary displacement thus selected are based on the assumption that the operative system provided on the respective interchangeable lens to effect the operation of stopping down is free from a mechanical load during the actual operation of stopping down and there occurs no time delay due to this mechanical operative system. In fact, it has been found that the mechanical operative system for stopping down is accompanied by a mechanical time delay particularly during the period from application with a signal for termination of stopping down to the actual termination thereof and such mechanical time delay must be considered in arrangement of said mechanical operative system.

Figure 4:
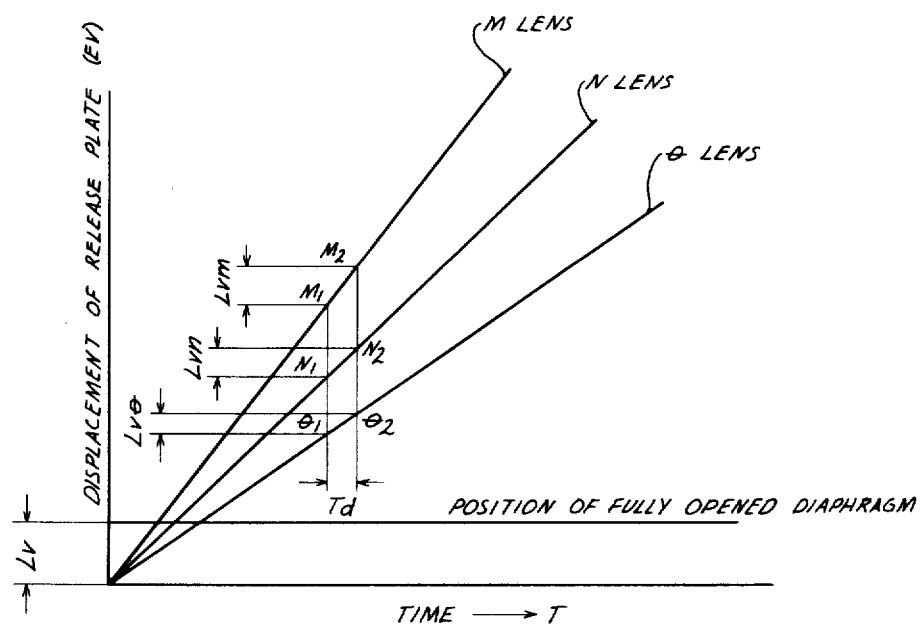
FIG. 4 is a graph illustrating the relationship between delay time and stopping distance of a plurality of interchangeable lenses.

FIG. 4 illustrates a diaphragm schematically showing such a lag or delay in the mechanical operative system. A displacement quantity of the release plate 31 is given in EV value by the axis of ordinate and a time required for stopping down is given by the axis of abscissa. When a relative linear relationship is given between the displacement quantity of the release plate 31 and the diaphragm value obtained from stopping down by said displacement quantity, variation in diaphragm values depending upon the displacement quantities of the release plate 31 are not always uniform due to various factors such as a biasing force of the spring normally striving to urge the diaphragm blades back to their fully opened positions, inertia and frictional loads of the respective operative members. Thus, the lenses are practically classified into three types, i.e., the high speed lens M, average lens N, and low speed lens O. FIG. 4 shows the respective characteristic lines of these three types. Strictly, a variation of speed appears in movement of the release plate 31 itself during a period from start to stoppage thereof and particularly the release plate 31 moves at a low speed immediately after its start. However, such variation is negligible relative to the automatic diaphragm control operation by the release plate 31 as a whole, since it is during said preliminary displacement that such speed variation occurs and has little influence upon the control result, even when this is approximately looked upon as a linear variation. Therefore, tendencies of the respective lenses of three types are linearly shown. A straight line extending in parallel to the axis of abscissa indicates the preliminary displacement quantities Lv of the release plate 31 until the diaphragm blades reach their positions corresponding to the fully opened diaphragm values of the respective lenses. With respect to the lens M in the diagram, if the release plate 31 is applied with a stoppage signal at a moment of a time $M_1$ elapsing after the release plate 31 has started, the diaphragm blades are actually stopped at a later moment $M_2$. Similarly, with the lens N, if the release plate 31 is applied with a stoppage signal at a moment $N_1$, the diaphragm blades are stopped at a later moment $N_2$ and, in the case of the lens O, the diaphragm blades are stopped at a later moment $O_2$ with a stoppage signal applied to the release plate 31 at a moment $O_1$. Accordingly, no matter which type the lens belongs to, there occurs a time delay Td from application of stoppage signal to actual stoppage of the diaphragm blades. This means that, to stop the diaphragm blades exactly at a moment corresponding to the desired diaphragm value, said stoppage signal must be applied to the release plate at a moment earlier than the desired moment of stoppage by such time delay Td due to the mechanical system or it would result in a stopping down in excess of the extent required for automatic diaphragm control.

The present invention proposes a countermeasure to this problem, too.

Referring again to FIG. 4, a quantity of stopping down achieved during the time delay Td due to the mechanical operative system depends upon the type of lens and such quantity can be substituted by the corresponding displacement quantity of the release plate 31 as follows:

Lens M . . . Lvm;
Lens N . . . Lvn; and
Lens O . . . Lvo.

It will be easily understood that the higher the speed of operation the lens has, the larger the quantity of stopping down made after application of the stoppage signal is.

Now, setting the circuit in the camera body for generation of the stoppage signal on the basis of the lens N having the average speed of operation, i.e., so that said circuit generates the stoppage signal earlier by a quantity Lvn with respect to the displacement quantity of the release plate 31 would result in actual quantities of stopping down excessive by Lvn-Lvo for the lens O; and
insufficient by Lvm-Lvn for the lens M.

Thus, the corresponding errors of diaphragm control would prevent achievement of the proper exposure. Also uniformly setting to Lv=Lvn on the basis of said preliminary displacement quantity Lv depending upon the fully opened diaphragm value of the lens N having the average speed of operation would result in diaphragm control errors corresponding to said deviations, even when the lenses having the same fully opened diaphragm value, so far as their speeds of operation are different due to the mechanical constructions peculiar to these lenses. Accordingly, the errors in quantities of stopping down corresponding to the respective time delays must be compensated independently of the gradient of characteristic line by setting the preliminary displacement quantities taking consideration of the time delays due to the mechanical systems of the respective types of lens as follows:

Lv=Lvm for the lens M;
Lv=Lvn for the lens N; and
Lv=Lvo for the lens O.

With respect to the camera and the objective according to the automatic diaphragm control mode which is incorporated with the compensation for a difference in the fully opened diaphragm values of the respective lenses interchangeably mounted on the camera and the compensation for a difference in the speeds of stopping down operation thereof, a preferred embodiment of the lens mounting arrangement by which the signal characterizing individual lenses are transmitted from the lens to the camera body is illustrated by FIG. 5.

Referring to FIG. 5, a portion designated by reference symbol CM corresponds to a mount on the camera for mounting of an objective while a portion designated by reference symbol LM corresponds to a mount on the lens. Both the mount CM on the camera body and the mount LM on the lens are shown at their surface along which they are mutually abutted, namely, the mount CM is shown as seen from the camera front, while the mount LM is shown as seen from the rear side of the lens. Both the mounts are provided with a pair of opposed contacts by which ON and OFF signals are transmitted in the form of binary code and these contacts are sometimes utilized to carry the electric current depending upon various electrical factors such as resistance value which is, in turn, determined by the fully closed diaphragm value and the other electrical quantities. There are provided a pair of contacts 19 and 91 through which the information on the fully closed diaphragm value for the individual interchangeable lens mounted on the camera and on the automatic diaphragm control position (Auto) determined by said fully closed diaphragm value is transmitted from the lens to the camera body. It is through this pair of contacts that the ΔAmin signal determined by said fully closed diaphragm value is transmitted from the lens to the camera body. This pair of contacts thus constitutes part of the fully closed aperture signal generating member $C_6$ shown in FIG. 2.

FIG. 6 shows, by way of example, a mechanism adapted to provide the previously mentioned preliminary displacement according to the present invention in the camera body. Referring to FIG. 6, reference numeral 41 designates a swing lever incorporated in the camera body. A driving lever 43 and swing lever 41 are mounted on a pivot 42 so that both these levers rotate about a common axis. A spring 44 is suspended between driving lever 43 and swing lever 41 to bias swing lever 41 toward driving lever 43. Reference numeral 45 designates a raised transverse forward end adapted to engage swing lever 41 to drive it as driving lever 43 is rotated counterclockwise in FIG. 6. Driving lever 43 has formed around its axis of rotation a sector gear 46 coupled by intermediate gears 47, 48 to a gear 50 which is, in turn, operatively associated with a detector discussed in more detail below. Reference numeral 51 designates an escape wheel serving as a brake shoe against rotation of gear 50. In addition, reference numeral 52 designates a stop that determines a starting position for driving lever 43. Driving lever 43 is locked in abutment with stop 52 by known means, such as a solenoid actuated pin (not shown) or brake shoe 51, when the shutter mechanism is charged prior to shutter release.

Reference numeral 31 designates the release plate of FIG. 3, which is disposed in the interchangeable lens mounted on the camera body, and reference numeral 32 designates a stop in the lens that determines the starting position for release plate 31. When release plate 31 abuts stop 32, the diaphragm is at the fully open, i.e., maximum, aperture value. The operational angle of swing lever 41 about pivot 42 corresponds to the operational amount of rotation of release plate 31.

In the preliminary displacement adjusting mechanism of the arrangement described above, release plate 31 is always biased by a spring force in the direction indicated by an arrow P, i.e., the direction in which the diaphragm blades are stopped down; but normally, such stopping down action is restrained by the force of spring 44, which is larger, typically about four times larger, than said force striving to stop the diaphragm blades down and acts upon release plate 31 via the swing lever 41 to urge release plate 31 against stop 32 before shutter release. Despite the greater force of spring 44, the diaphragm is kept at its maximum aperture value because stop 32 limits movement of release plate 31 responsive to the force of spring 44. 45 is a raised forward end of driving lever 43. When driving lever 43 is unlocked upon shutter release, it rotates counterclockwise through an angle γ before raised end 45 engages swing lever 41; during this segment of rotation, swing lever 41 and release plate essentially remain in the position shown in FIG. 6. After raised end 45 engages swing lever 41, driving lever 43 and swinger lever 41 are rotated upwards as a unit by the bias P on release plate 31, thus stopping the diaphragm blades down. With this embodiment, accordingly, an angle γ defined by the upper surface of raised end 45 and release plate 31 relative to the center of pivot 42 corresponds to the preliminary displacement. The location of stop 32 in each interchangeable lens determines the angle γ introduced between spring lever 41 and driving lever 43 because release plate 31 of the lens mounted on the camera body separates the lower edge of swing lever 41 from raised end 45 as the lens is being mounted on the camera body. Thus, the position of stop 32 is precisely and uniquely set for each lens so as to introduce the desired preliminary displacement when such lens is mounted on the camera body.

The detector operatively associated with gear 50 senses rotational displacement thereof. The rotational motion of gear 50 is in proportion to the rotation of driving lever 43, namely, the rotational displacement of gear 50 corresponds to the stopped down aperture value and the output of the detector, which is represented as circuit $C_{10}$ in FIG. 2, is transmitted as the aperture value (Av') to circuit $C_{11}$ in FIG. 2. Gear 50 stops its motion at a predetermined aperture value in response to the signal from the circuit $C_{12}$ which actuates diaphragm control magnet E Emg in FIG. 2. Escape wheel 51 stops rotation of gear 50 when magnet E Emg is energized. Reference is made to Application Ser. No. 258,044, filed Apr. 28, 1981, now U.S. Pat. No. 4,360,257, for one embodiment of the detector cooperating with gear 50 and an alternative to escape wheel 51 for arresting diaphragm stop down, namely, a locking tooth shown in FIG. 6 of this co-pending application. The disclosure of this application is incorporated herein by reference. Circuit $C_{10}$ in FIG. 2, i.e., the described detector, comprises a pulse generator and counter as described in the referenced application.

Except release plate 31 and stop 32 on the lens, the described elements are located in the camera body. The necessary preliminary displacement of each interchangeable lens is transmitted from such lens to the camera body in the form of the angle γ, which is determined by the position of stop 32 in each lens.

In operation, before diaphragm stop down, the elements are positioned as shown in FIG. 6. Driving lever 43 is locked by a known means which is operatively associated to the shutter release button. The contraction force of spring 44 is 3 to 4 times or more the force "P" of release plate 31. Nevertheless, the release plate 31 is held at the position shown in FIG. 6 (the fully opened aperture position) by stop 32.

Upon releasing the shutter button, driving lever 43 is released from its locked position and rotates counterclockwise towards swing lever 41 by the force of spring 44, so that the upper surface of raised end 45 is pressed against the lower surface of swing lever 41. At this point, driving lever 43 and swing lever 41 become a unit for the remainder of the operation because of spring 44. When driving lever 43 and swing lever 41 abut each other, release plate 31 is freed from the force of spring 44. Consequently, the force of release plate 31 biased in the direction of arrow P urges swing lever 41 to rotate counterclockwise. Driving lever 43 and swing lever 41 continue to rotate counterclockwise until escape wheel 51 stops gear 50. The rotational displacement of driving lever 43 is transmitted to gear 50 via gears 46, 47, and 48 and, in turn, the rotation of gear 50 is sensed by the detector operatively associated with gear 50. In response to the signal from circuit $C_{12}$, escape wheel 51 stops rotational motion of gear 50 which, in turn, causes release plate 31 to stop at a given position. This stopped position of release plate 31 corresponds to a desired diaphragm aperture value. After completion of the photographic operation, driving lever 43 is returned to its initial position (as shown in FIG. 6) in a known manner. See, for example, the referenced application.

The rotation of driving lever 43 through angle γ until its engagement with swing lever 41 is sensed by the detector coupled to the gear 50, thereby contributing to the aperture value Av' generated by circuit $C_{10}$. However, within this angle of rotation, the diaphragm blades remain unmoved and, therefore, angle γ can be utilized as preliminary displacement.

Since the initial rotation of drive lever 43, which corresponds to the preliminary displacement prescribed for the particular lens, does not result in any reduction of the aperture value, a number of the pulses stored in the counter do not correspond to actual reduction of aperture value, but instead correspond to the characteristics of the particular lens, thereby providing compensation for different lens characteristics from lens to lens.

It should be noted that the introduction of a preliminary displacement in the camera body, as disclosed, permits the use of a single pulse generator in the detector rather than a pulse generator for each lens.

The preliminary displacement adjusting apparatus shown in FIG. 6 provides a desired preliminary displacement in the camera body independently of the lens. Thus, this apparatus is a replacement for the arrangement described in FIG. 3, wherein a preliminary displacement is introduced by beginning diaphragm blade movement at a position I, rather than at a position II, at the inner periphery of the blade actuating ring. Of course, if desired, the apparatus of FIG. 6 can be used to supplement, rather than replace, the preliminary displacement introduced in the diaphragm blade driving mechanism of the lens as described in FIG. 3.

As will be obvious from the foregoing description in detail, the present invention enables an operation of stopping down with highest precision by automatic diaphragm control through the operation of stopping down which already includes therein the compensation by a simple mechanism of both the illumination intensity error in the film plane appearing due to the illumination intensity variation depending upon individual interchangeable lenses mounted on the camera and the illumination intensity error due to the position of the photometric element depending on various factors of this lens on one hand, and by providing the mechanism serving for stopping down with the preliminary displacement taking no part in the actual stopping down effect for the interchangeable lenses on the other hand. Concerning said preliminary displacement quantity, a delay occurring in the mechanical operation determined by the different speed of stopping down which depends, in turn, upon the individual lens interchangeably mounted on the camera is also considered and thereby said preliminary displacement quantity is further finely adjusted so that the automatic exposure control can be achieved with an extremely high precision including therein the effective compensation of the deviations caused by all the factors depending on the individual lenses. In spite of achievement of such high precision exposure control, the present invention advantageously simplifies the mount construction along which the interchangeable lens is coupled to the camera body, since it is unnecessary, in accordance with the present invention, to transmit the information signal related to the fully opened diaphragm of the respective lens from the latter via the lens mount to the camera body so as to be incorporated into the regulating factors for the exposure control circuit which is also simplified in its construction according to the present invention and particularly no means is required to change over the fully opened diaphragm signal in order to compensate the change of F value when a zoom lens accompanied with said change of F value is mounted on the camera. The present invention accordingly provides the desired interchangeable lens single-lens reflex camera of automatic exposure control type which is simple, as well as compact, in its all-over construction, obtainable at a low cost and alsmost trouble-free.

What is claimed is:

1. A camera comprising:
   a first displaceable actuator;
   a second displaceable actuator;
   a diaphragm adjustable between a maximum aperture value and a minimum aperture value responsive to displacement of the second actuator;
   means for generating a first signal representative of the displacement of the first actuator;
   means for generating a second signal representative of the desired aperture value of the diaphragm for correct exposure;
   means for comparing the first and second signals;
   means for displacing the first actuator upon shutter release;
   means for maintaining the second actuator stationary during an initial portion of the displacement of the first actuator and displacing the actuators as a unit during the remainder of the displacement of the first actuator; and
   means responsive to the comparing means for arresting displacement of the actuators when the first and second signals assume a predetermined relationship.

2. The camera of claim 1, in which the first actuator is a drive lever mounted to rotate about a pivot point; the second actuator includes a swing lever mounted to rotate about the pivot point and a release plate engageable with the swing lever, the diaphragm being adjusted from its maximum aperture value to its minimum aperture value when the swing lever and the drive lever rotate in a first given direction about the pivot point and the release plate moves in a second given direction when engaging the swing lever, the release plate being biased in the second given direction; and the maintaining and displacing means includes means for biasing the swing lever toward the drive lever, a stop for limiting movement of the release plate opposite the second given direction, the location of the stop defining a preliminary angular displacement between the swing lever and the drive lever when the drive lever is locked, means upon shutter release for unlocking the drive lever, and means for coupling the drive lever to the swing lever for rotation as a unit after the drive lever has rotated individually through the preliminary angular displacement.

3. The camera of claim 2, additionally comprising a camera body and an interchangeable lens mounted on the camera body, the drive lever and the swing lever being disposed in the camera body and the release plate and the stop being disposed in the lens.

4. The camera of claim 3, in which the first signal generating means is disposed in the camera body.

* * * * *